(12) United States Patent  
Nguyen

(10) Patent No.: US 7,522,428 B2
(45) Date of Patent: Apr. 21, 2009

(54) ELECTRIC DEVICE DESIGNED TO BE ATTACHED TO A MOUNTING RAIL, AND CORRESPONDING MOUNTING METHOD

(75) Inventor: Eric Nguyen, Saint Etienne (FR)

(73) Assignee: ABB France, Rueil Malmaison (FR)

( * ) Notice: Subject to any disclaimer, the term of this patent is extended or adjusted under 35 U.S.C. 154(b) by 17 days.

(21) Appl. No.: 11/898,453

(22) Filed: Sep. 12, 2007

(65) Prior Publication Data

US 2008/0089047 A1 Apr. 17, 2008

(30) Foreign Application Priority Data

Oct. 13, 2006 (FR) .................................. 06 09005

(51) Int. Cl.
H05K 1/11 (2006.01)
(52) U.S. Cl. .................. 361/803; 361/759; 361/796; 361/801; 439/121; 439/532; 439/716
(58) Field of Classification Search ............. 361/807, 361/803, 759, 801, 796; 439/121, 532, 716
See application file for complete search history.

(56) References Cited

U.S. PATENT DOCUMENTS 5,879,173 A * 3/1999 Poplawski et al. .......... 439/138
6,497,529 B2 * 12/2002 Comtois et al. ............. 403/325
6,567,275 B1 * 5/2003 Hou et al. .................. 361/807
2003/0002270 A1 * 1/2003 Kitadai ...................... 361/807
2003/0143896 A1 * 7/2003 Bet et al. .................... 439/716

* cited by examiner

Primary Examiner—Dean A. Reichard
Assistant Examiner—Andargie M Aychillhum
(74) Attorney, Agent, or Firm—Oliff & Berridge, PLC

(57) ABSTRACT

Electric device, designed to be attached to a mounting rail, comprising a body fitted with means for locking onto the rail comprising at least one lug that can be moved between a locked position and an unlocked position, designed to interact with a first edge of the rail, the lug being subjected to the action of an elastic element placed in a housing of the body and pressing on the latter and on the movable lug, wherein the elastic element is of elongated shape, substantially rectilinear in a rest position, the housing comprising an opening for the insertion of the elastic element, placed substantially along the same axis as that of the elastic element in the rest position and leading to the outside of the body, on the lateral face of the body perpendicular to the longitudinal axis of the rail.

6 Claims, 3 Drawing Sheets

ELECTRIC DEVICE DESIGNED TO BE ATTACHED TO A MOUNTING RAIL, AND CORRESPONDING MOUNTING METHOD

BACKGROUND OF THE INVENTION

The invention relates to an electric device, designed to be attached to a mounting rail, and a corresponding mounting method.

DESCRIPTION OF THE PRIOR ART

Electric devices are usually attached by means of standardized rails, called DIN rails, in an electric cabinet.

According to a known embodiment, an electric device, for example a contactor, comprises a body fitted with means for locking onto the rail comprising at least one lug that can be moved between a locked position and an unlocked position, designed to interact with a first edge of the rail, the lug being subjected to the action of an elastic element placed in a housing of the body and pressing on the latter and on the movable lug.

In order to allow an easy, that is to say without requiring tools, mounting and removal of the electric device onto/from the guide rail, the electric device usually comprises an elastic element of complex structure or an element of the spring type.

The mounting of this type of elastic element is difficult to achieve, which substantially increases the costs of manufacturing the electric device.

The invention therefore aims to remedy these disadvantages by proposing an electric device that is easy to assemble and is of low cost, while allowing it to be easily removed from the mounting rail.

SUMMARY OF THE INVENTION

Accordingly, the invention relates to an electric device of the aforementioned type, wherein the elastic element is of elongated shape, substantially rectilinear in the rest position, the housing comprising an opening for the insertion of the elastic element, placed substantially along the same axis as that of the elastic element in the rest position and leading to the outside of the body, on the lateral face of the body perpendicular to the longitudinal axis of the rail.

Therefore, the elastic element may be easily mounted in the body of the electric device, more precisely in the housing provided for this purpose, by means of the insertion opening.

Advantageously, the housing of the body comprises two bearing zones for the elastic element, out of line along the axis of the latter in the rest position.

Preferably, the lug comprises an opening for the elastic element to pass through.

According to one embodiment of the invention, the opening for the movable lug to pass through comprises at least one guide zone having at least one wall inclined in the direction of insertion of the elastic element.

According to one feature of the invention, the elastic element is a stem of substantially cylindrical shape.

This type of elastic element is not very complex and is therefore not very costly to produce, while offering the characteristics of elasticity necessary for locking the electric device onto the rail.

The invention also relates to a method of assembling an electric device according to the invention, which comprises the following steps:

moving the movable lug against its elastic return force into a mounting position in which the lug forms no obstacle to the insertion of the elastic element,
inserting the elastic element,
releasing the movable lug which presses against the elastic element.

BRIEF DESCRIPTION OF THE DRAWING

In any case, the invention will be well understood with the aid of the following description, with reference to the appended schematic drawing representing, as non-limiting examples, several forms of execution of this electric device.

DESCRIPTION OF THE PREFERRED EMBODIMENTS

Figure 1:
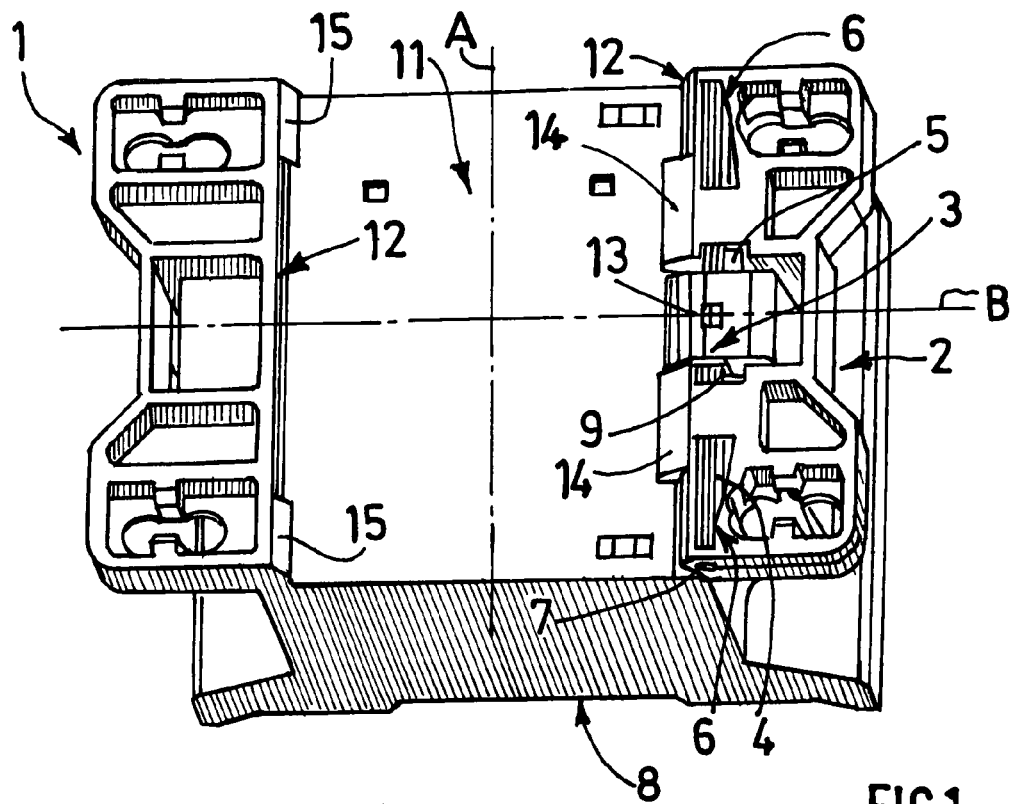
FIG. 1 is a view in perspective, from below, of the electric device according to the invention.
Figure 2:
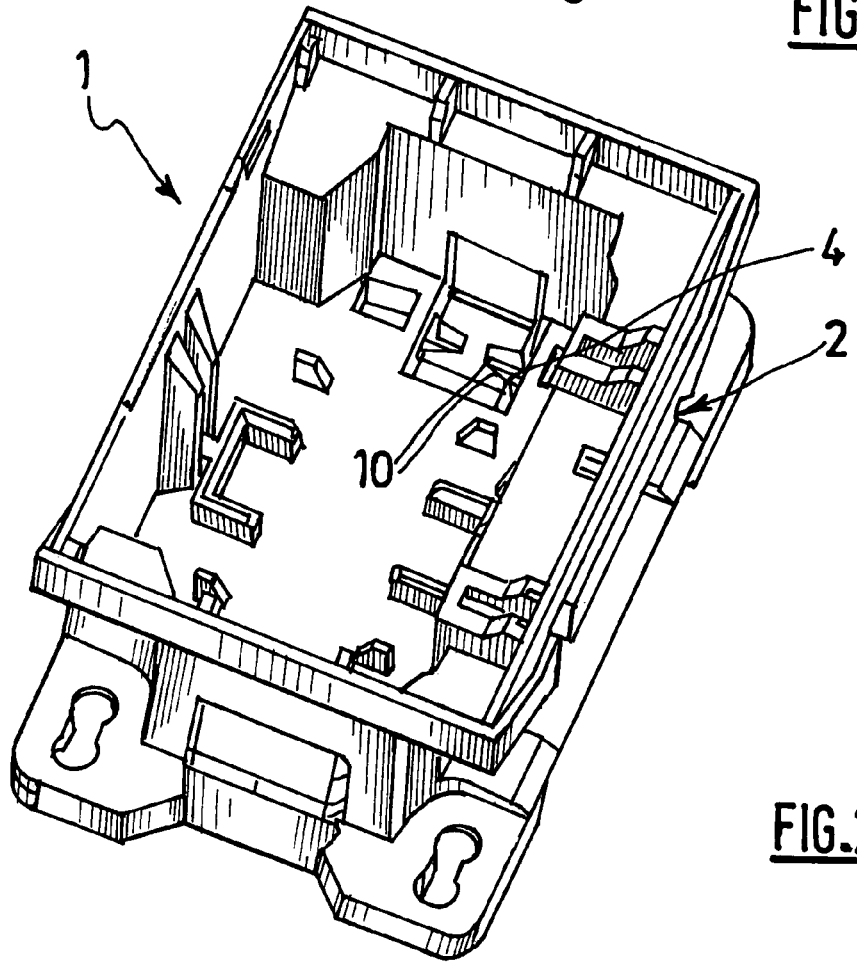
FIG. 2 is a view in perspective from above.

FIGS. 1, 2, 5, 6 and 7 represent an electric device 1, in particular a contactor, designed to be attached to a mounting rail (not shown) and comprising a body 2 of substantially parallelepipedal shape and forming a dish opening towards the outside at its upper face, as is shown in FIG. 2, the dish being designed to accommodate electric elements (not shown), in a manner known per se.

The body 2 is fitted, at its bottom face, with means for locking onto the rail comprising at least one lug 3 that can be moved between a locked position and an unlocked position, designed to interact with a first edge of the rail. The lug 3 is subjected to the action of an elastic element 4 placed in a housing 5 of the body 2 and pressing on the latter and on the movable lug 3.

The elastic element 4 has the shape of a stem that is substantially rectilinear or substantially cylindrical in the rest position, that is to say when it is not subjected to any external stress.

The elastic element 4 presses, at each end, on a bearing zone 6 of the housing 5.

The housing 5 also comprises an opening 7 for the insertion of the elastic element 4, placed substantially along the same axis as that of the elastic element 4 in the rest position and leading to the outside of the body 2, on a lateral face 8 of the body 2 perpendicular to the longitudinal axis A of the rail.

The movable lug 3 is molded with the body 2 and comprises at least one elastic zone allowing it to move and an opening 9 for the elastic element 4 to pass through, also placed in the axis of the elastic element 4 in the rest position. The latter comprises a guide zone having two inclined walls 10 facing one another and converging towards the aforementioned axis in the direction of insertion of the elastic element 4.

These two inclined walls 10 are spaced, at their closer end, at a distance corresponding substantially to the diameter of the elastic element 4.

Thus, in order to insert the elastic element 4 into the housing 5 of the body 2, the operator first moves the movable lug 3 against its return force into a mounting position in which the latter does not oppose the insertion of the elastic element 4. This mounting position is defined more precisely by the position in which the opening 9 for the movable lug 3 to pass through is situated in the axis of insertion of the elastic element 4, facing the opening 7.

The operator then inserts the elastic element 4 into the housing 5, by means of the opening 7, and then releases the movable lug 3.

The body 2 defines a rail attachment zone delimited by a bearing surface 11, parallel to the bottom surface of the body and out of line towards the top surface, and by two lateral surfaces 12 extending from the bearing surface 11 to the bottom surface of the body.

A first lateral surface 11, placed on the side of the first bearing edge of the rail in contact with the movable lug 3, is perforated so as to allow the movable lug 3 to pass through.

According to one possibility of the invention, the latter may comprise a wall 13 that is inclined or domed so as to make it easier to install the electric device 1 on the rail, as described in greater detail below.

The locking means comprise two fixed lugs 14 placed on either side of the movable lug 3 and designed to interact with the first edge of the rail.

The second lateral wall 12, placed opposite the first 11, comprises two fixed lugs 15 designed to interact with the second edge of the rail.

In addition, each of the fixed lugs 14 and 15 is placed so as to define a space with a height substantially equal to the thickness of the corresponding edge of the rail.

Figure 3:
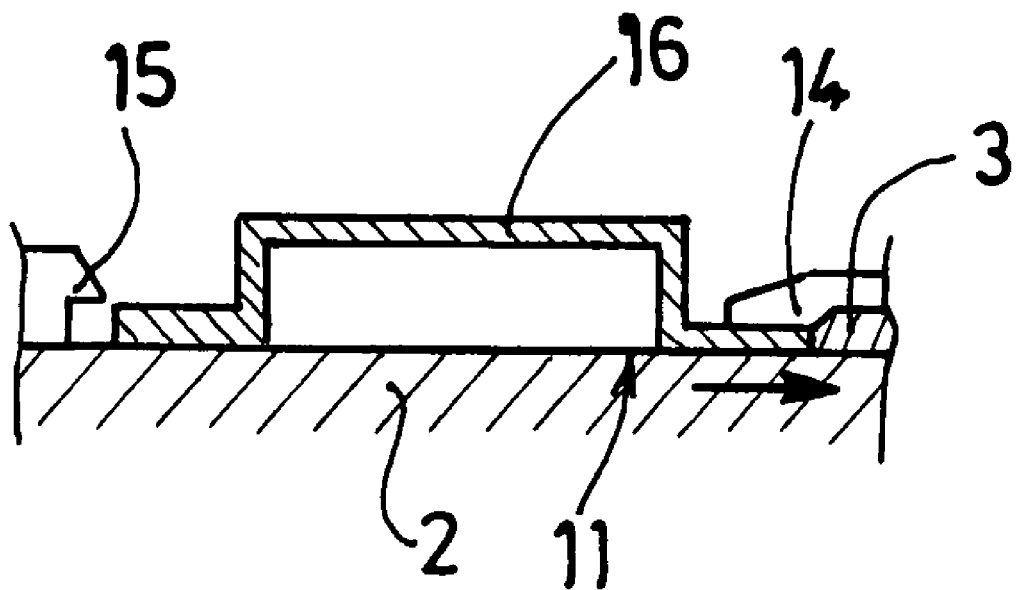
FIGS. 3 and 4 are enlarged views, in partial section along the axis B, representing the attachment of the electric device onto the rail.

Therefore, as shown in FIG. 3, when the electric device 1 is attached to the rail 16, the operator first of all inserts the first edge of the rail 16 between the rigid lugs 14 and the bearing surface 11 and then presses against the movable lug 3 so that the latter moves away from the attachment zone of the rail 16.

Figure 4:
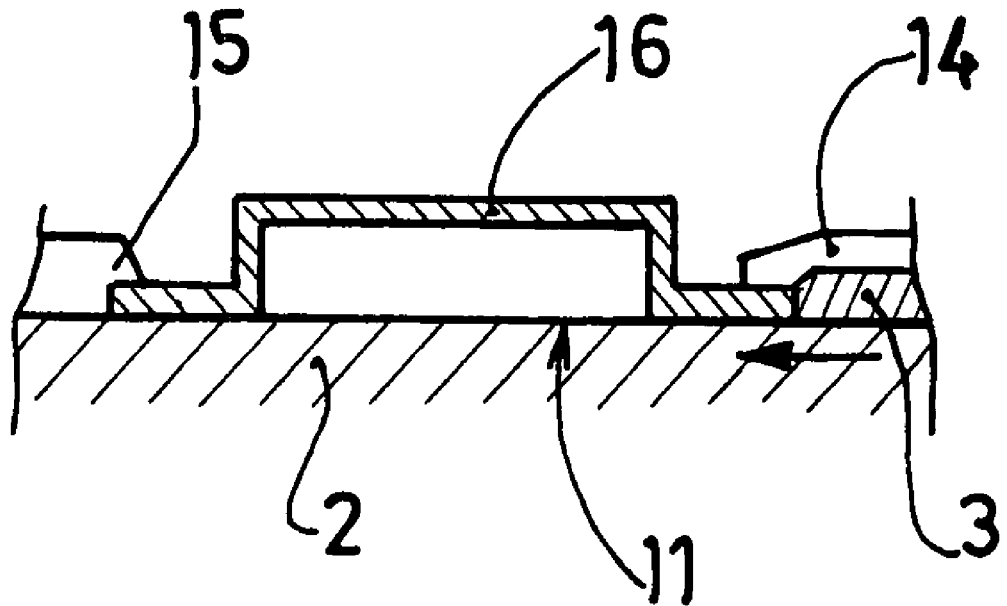
Figure 5:
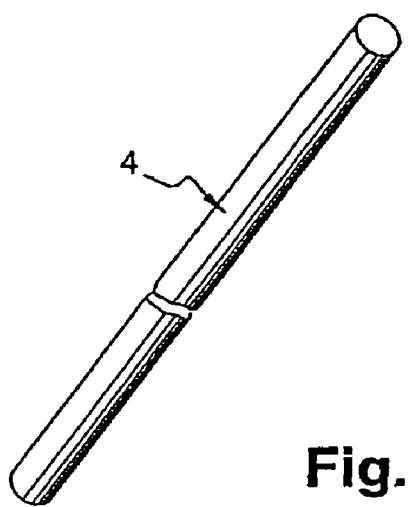
FIG. 5 is a partial side view in perspective of the elastic device having the elastic element outside the housing.
Figure 6:
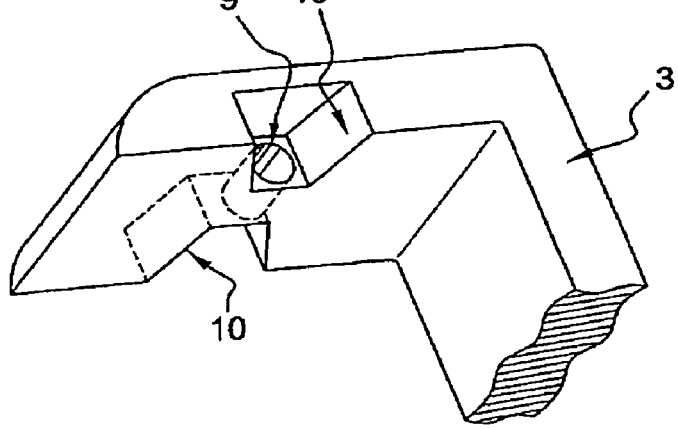
FIG. 6 is a partial bottom view of the elastic device where the elastic element is at rest.
Figure 6:
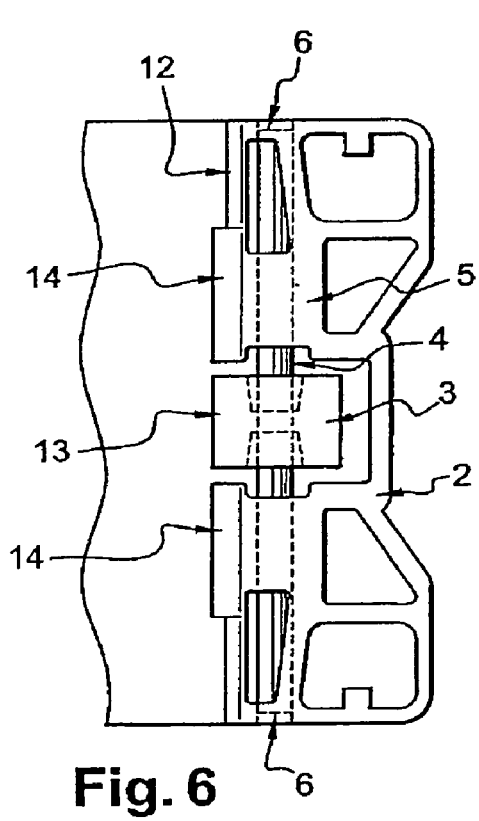
Figure 7:
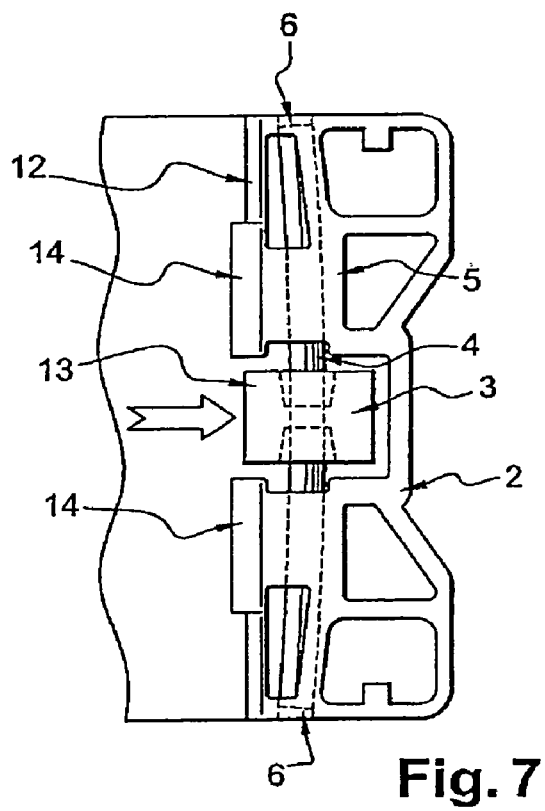
FIG. 7 is a partial bottom view of the elastic device where the elastic element is acted upon.

As shown in FIG. 4, the operator releases the body 2 when the bearing surface 11 of the body is pressing against the rail. The movable lug 3, whose bearing end exerts a force against the first edge of the rail 16, then pushes the second edge of the rail 16 under the fixed lugs 15.

Preferably, a flute or a protruding element 17 is made on the bearing surface 11 so as to push the first edge of the rail 16 against the lugs 14 in the direction orthogonal to the bearing surface 11, in order to help the retention of the electric device on the rail.

The electric device can be removed simply, by manually moving the movable lug 3 to its unlocked position and then withdrawing the electric device 1.

It goes without saying that the invention is not limited solely to the forms of execution of this system described above as an example, but, on the contrary, it covers all the variants.

The invention claimed is:

1. An electric device, designed to be attached to a mounting rail, comprising:
    a body for locking onto the rail comprising at least one lug being movable between a locked position and an unlocked position and configured to interact with a first edge of the rail;
    an elastic element of elongated shape, the elastic element configured to act on the lug and housed in the body; and
    a housing of the body, the housing comprising an opening for the insertion of the elastic element, the opening leading to the outside of the body.

2. The electric device as claimed in claim 1, wherein the housing of the body comprises two bearing zones for respective ends of the elastic element.

3. The electric device as claimed in claim 1, wherein the movable lug comprises an opening for the elastic element to pass through.

4. The electric device as claimed in claim 1, wherein the elastic element is a stem of rectilinear or cylindrical shape in a rest position.

5. A method of assembling an electric device as claimed in claim 1, which comprises the following steps:
    moving the movable lug against its elastic return force into a mounting position in which the lug forms no obstacle to the insertion of the elastic element,
    inserting the elastic element,
    releasing the movable lug which presses against the elastic element.

6. The electric device as claimed in claim 3, wherein the opening for the movable lug to pass through comprises at least one guide zone having at least one wall included in the direction of the insertion of the elastic element.

* * * * *